United States Patent [19]
Cho

[11] Patent Number: 5,200,811
[45] Date of Patent: Apr. 6, 1993

[54] HIGH DEFINITION TELEVISION VIDEO SIGNAL RECEIVER AND PROCESSING METHOD THEREFOR

[75] Inventor: Hyun-Deok Cho, Suwon City, Rep. of Korea

[73] Assignee: Samsung Electronics Co., Ltd., Suwon, Rep. of Korea

[21] Appl. No.: 685,822

[22] Filed: Apr. 16, 1991

[30] Foreign Application Priority Data

May 11, 1990 [KR] Rep. of Korea .................. 1990-6721

[51] Int. Cl.$^5$ .......................... H04N 9/78; H04N 9/64
[52] U.S. Cl. ...................................... 358/12; 358/141; 358/188; 358/160; 358/21 R
[58] Field of Search ............... 358/188, 105, 140, 141, 358/11, 12, 21 R, 31, 36, 37, 167, 166, 189, 197, 23

[56] References Cited

U.S. PATENT DOCUMENTS

| | | | |
|---|---|---|---|
| 4,658,285 | 4/1987 | Lewis, Jr. | 358/36 |
| 4,672,445 | 6/1987 | Casey et al. | 358/140 |
| 4,885,637 | 12/1989 | Fukinuki et al. | 358/31 X |

Primary Examiner—Victor R. Kostak
Attorney, Agent, or Firm—Robert E. Bushnell

[57] ABSTRACT

A method for receiving a high definition television signal has been used by the band-splitting and sub-sampling method. The concrete embodiment for the method can be accomplished by converting the received radio frequency signal into a first intermediate frequency signal, and by splitting a second intermediate frequency signal and a narrow band intermediate frequency signal therefrom. The narrow band intermediate frequency signal is lacked a given fixed frequency to demodulate the second intermediate frequency signal in a quadrature phase-shift technique. The demodulated signal is low-pass filtered and converted into a digital signal to separate into a synchronizing, an audio signal, a control signal therefrom. The digital signal is processed at high frequency band according to the control signal, and delayed a given time. The delayed signal is added to the signal processed at high frequency band. The added signal is separated into a luminance and chrominance signals to convert into an analog signals.

36 Claims, 13 Drawing Sheets

● : ORIGINAL SIGNAL

○ : INTERPOLATION SIGNAL

O : Nth FRAME

□ : (N−1)th FRAME

HIGH DEFINITION TELEVISION VIDEO SIGNAL RECEIVER AND PROCESSING METHOD THEREFOR

BACKGROUND OF THE INVENTION

The present invention relates to a circuit for receiving High Definition Television (hereinafter referred to as HDTV) signal and signal processing method therefor by using a frequency band splitting and sub-sampling methods in HD TV picture receiver.

HDTV has been researched by Japan since 1960 as a way to improve picture quality of conventional color TV. Emphasis of the research has been laid on getting more dynamic and lively picture quality, aiming at providing a high quality picture equivalent to the picture quality enjoyed in ordinary movie theaters. Japan's lead in the HDTV research had been continued until early 1980's, however, other countries have also started to move into the research since mid 1980's.

Japan has completed development of multiple subnyquist sub-sampling encoder (hereinafter referred to as MUSE) method for HDTV centered around NHK while Europe has been developing HD-MAC method that is completely different from the MUSE method of Japan. In U.S.A., number of methods are suggested but none of the methods have become a standard yet. The methods suggested in U.S.A. are AC-TV of DSRC, spectrum-compatibility HD-TV of Zenith, Mit of MIT, and SLSC of Bell Laboratory. The MUSE employs multiple sub-sampling technique. The Mit method employs Sub-band coding technique. Basically, types other than the above methods mostly adopt techniques described above.

However, in the current research and development of the HDTV broadcasting technique, it is demanded that not only high quality picture but also compatibility with existing color TV (NTSC color television) should be achieved.

The MUSE method of NHK of Japan is not compatible with existing color TV, but the AC-TV method of the DSRC which is one of the several HDTV methods suggested in U.S.A., multiplexes other TV signals with existing color TV signals (NTSC signal) so as to be compatible with the existing color TV. However, the AC-TV method of the DSRC has number of technological problems to be resolved, and particularly, is known to have limits in getting higher frequency band in processing TV signals.

It is newly demanded, as a way to solve the problems raised in the AC-TV, that the HDTV signals adopt the same frequency band as that of the existing color TV, while keeping the compatibility with the existing color TV. In this case, the channel unused in the existing color TV is used to transmit the HDTV signal.

SUMMARY OF THE INVENTION

It is therefore an object of the present invention to provide HDTV with the same frequency band as existing NTSC color TV.

It is another object of the present invention to provide a circuit and method for decoding received HDTV signal having spectrum compatibility by employing frequency band splitting and sub-sampling methods.

According to the present invention, there is provided a circuit for processing a received signal, a circuit for locking into a given stable frequency the first processing signal and for demodulating the second processing signal by using quadrature phase-shift method, a circuit for low-pass filtering the demodulated signals and for converting the low-pass filtered signals into digital signals, a circuit for separating the first digital signal into synchronizing, audio and control signals, a circuit for processing the first converted digital signal at high frequency band according to the separated control signal, a circuit for delaying the second converted digital signal for a given time and for adding the delayed signal to the signal processed at high frequency band and a circuit for separating the added signal into luminance and chrominance signals to be converted into analog signals.

BRIEF DESCRIPTION OF THE INVENTION

For a better understanding of the invention and to show how the same may be carried into effect, reference will now be made, by way of example, to the accompanying diagrammatic drawings, in which.

Figure 1:
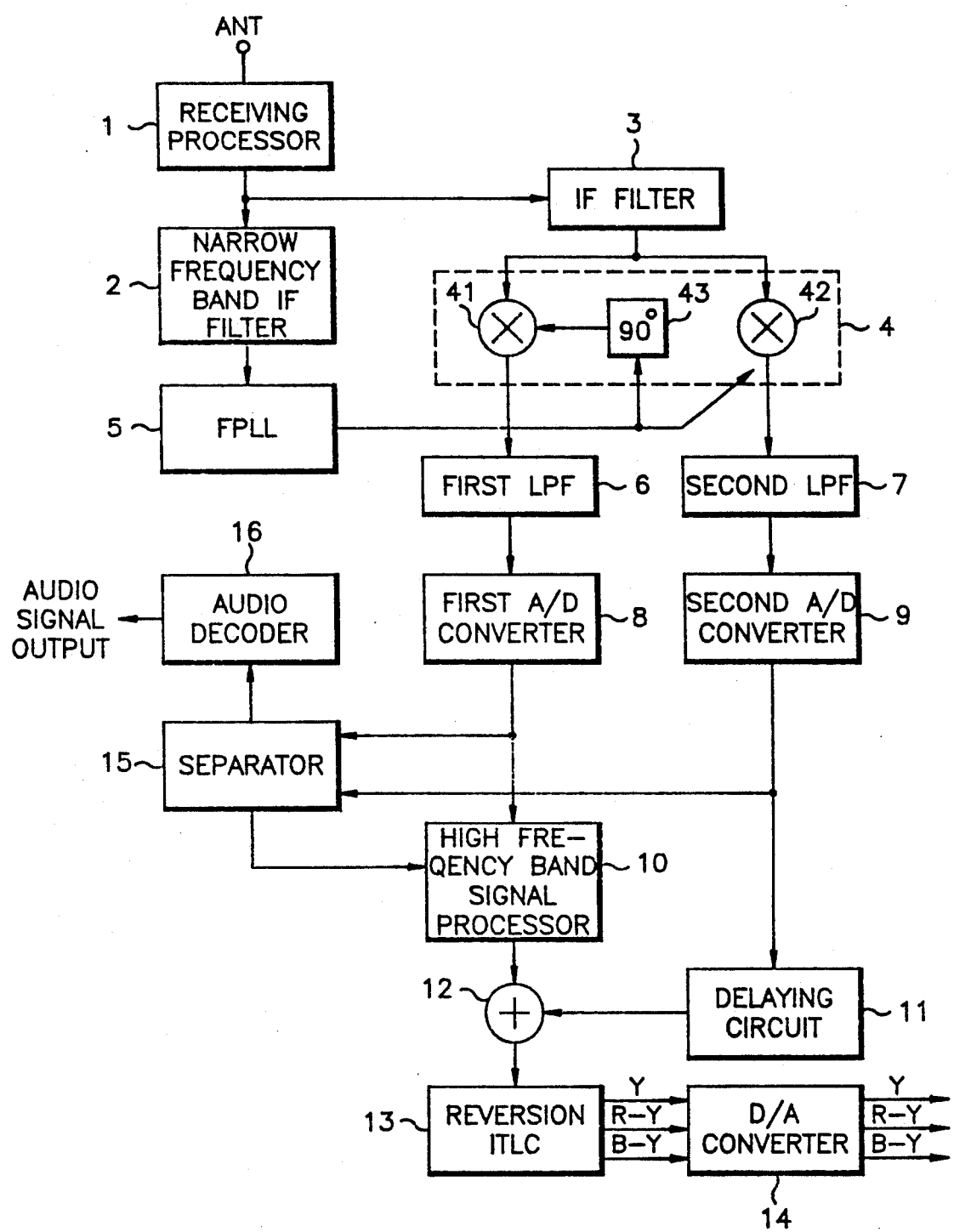
FIG. 1 is a block diagram showing a HDTV signal receiving circuit according to the present invention.
Figure 15:
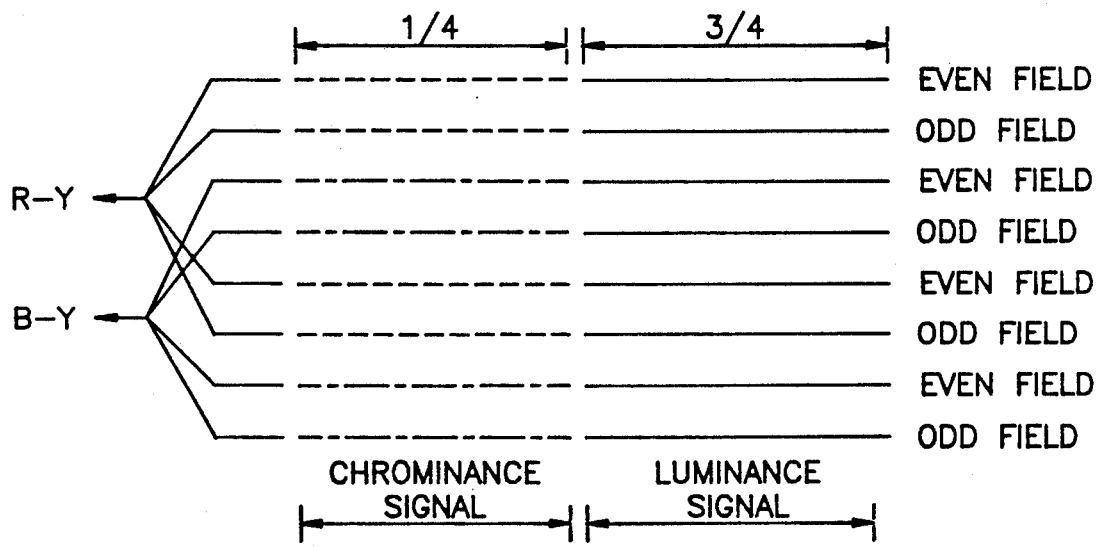
Figure 16A:
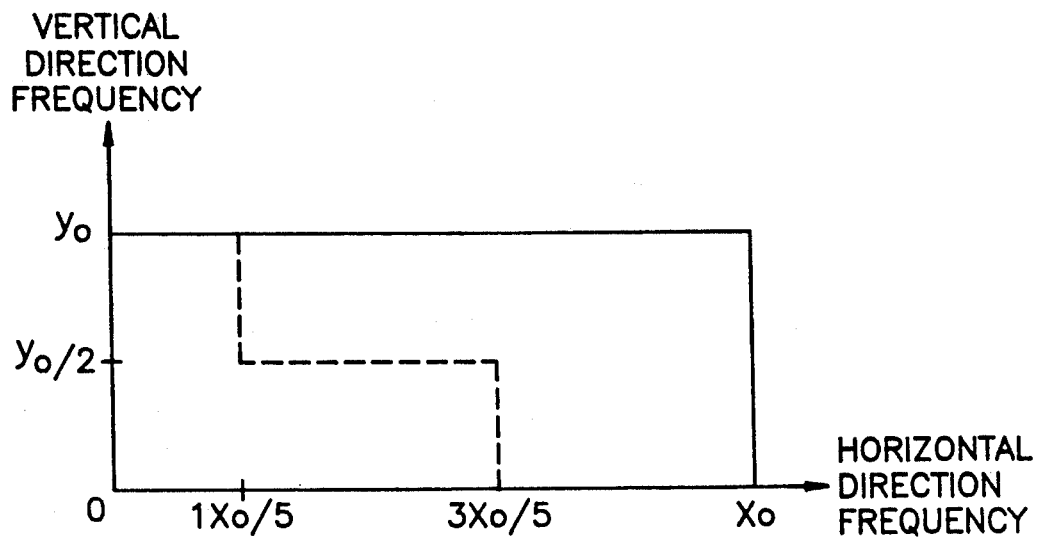
Figure 16B:
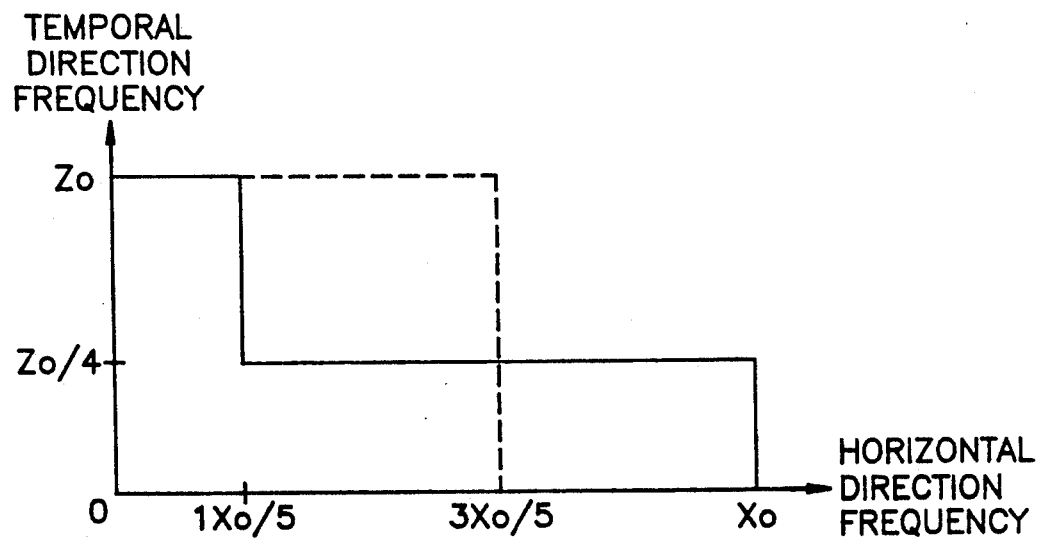

FIG. 15 is a schematic diagram for showing the input data format of an inversion ITLC circuit 13 of FIG. 1; and FIGS. 16A and 16B are graphs showing the spectrum of the inversion ITLC circuit 13 or the first and second A/D converters 8, 9 shown in FIG. 1.

DETAILED DESCRIPTION OF THE INVENTION

Referring to FIG. 1, a receiving processor 1 converts a radio frequency frequency (hereinafter referred to as an RF signal), which is supplied from an antenna (ANT), into an intermediate frequency (hereinafter referred to as IF) signal. A narrow frequency band IF filter 2 connected to an output terminal of the receiving processor 1, filters the signal output from the receiving processor 1 at a narrow frequency band to split an IF signal having a carrier therefrom. An IF filter 3 connected to an output terminal of the receiving processor 1, filters an IF signal necessary to receive a HDTV signal out of the signal output from the receiving processor 1. A frequency phase locked loop (hereinafter referred to as FPLL) 5 locks up the IF signal output from the filter 2 into a given constantly fixed frequency. A quadrature phase-shift demodulator 4 has multipliers 41, 42 respectively connected to the output terminals of the IF filter 3. The multiplier 41 multiflie the signal output from the filter 3 by the signal output from a 90° phase-shifter 43 connected to the FPLL 5. The multiplier 42 multiflie the signal output from the filter 3 by the signal output from the FPLL 5. The signals output from the multipliers 41, 42 are demodulated in a quadrature phase-shift demodulation method and separated into the high and low frequency band signals respectively.

The first and second low-pass filters (hereinafter referred to as LPF) 6, 7 connected to the output terminals of the multipliers 41, 42, respectively, filter at low frequency the signals output from the quadrature phase-shift demodulator 4. The LFPs 6, 7 filter the frequency band of ($\frac{1}{4}$)Xo' of the high and low frequency band signals output from the multipliers 41, 42 in a horizontal axis respectively. In this case, the Xo' represents the frequency band output from the high frequency band signal processor 10. The first and second A/D converters 8, 9 convert the signals output from the first and second LPFs 6, 7 to digital signals respectively. A separator 15 receiving the signals from the first and second A/D converters 8, 9, separates the received signal into a synchronizing signal, an audio signal, a motion vector and a control signal. An audio decoder 16 decodes the separated audio signal from the separator 15. A high frequency band signal processor 10 connected to the first A/D converter 8, processes the high frequency band signal therefrom, according to the control signal output from the separator 15.

A delaying circuit 11 delays the signal from the second A/D converter 9 for a given time then the signals from the second A/D converter 9 and the high frequency band signal processor 10 are added by an adder 12. The inversion ITLC (Integration of Time compressed Luminance and Chrominance) circuit 13 converts the signal output from the adder 12 into luminance signal Y and chrominance signals B-Y, R-Y. A D/A converter 14 converts the Y, B-Y and R-Y signals output from the inversion ITLC circuit 13 into analog signals, respectively.

Figure 2:
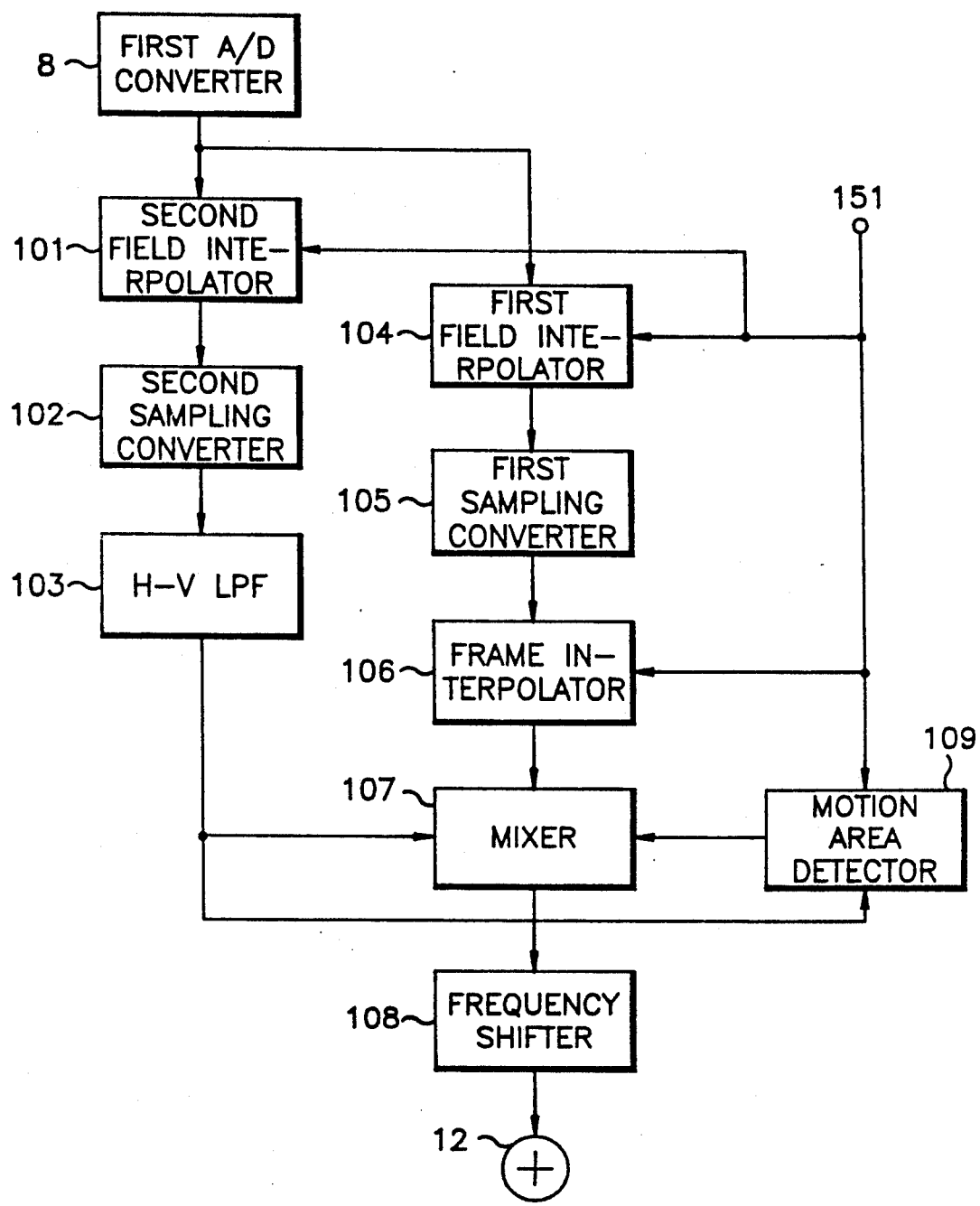
FIG. 2 is a more detailed diagram of a high frequency band signal processor 10 shown in FIG. 1.

Referring to to FIG. 2, a first field interpolator 104 connected to the first A/D converter 8, interpolates between the fields of the digital signal output from the first A/D converter 8. A second field interpolator 101 connected to the first A/D converter 8, receives the digital signal therefrom to interpolate between the fields according to the motion vector output from the separator 15. A first sampling converter 105 connected to the output terminal of the first field interpolator 104, converts the input sampling to output sampling in the ratio of 1:2. A second sampling converter 102 connected to the second field interpolator 101, converts the input sampling to output sampling in the ratio of 1:2.

A H-V LPF 103 filters a given frequency band of the signal output from the second sampling converter 102 in the direction of the horizontal and vertical. A frame interpolator 106 connected to the first sampling converter 105, receives the signal output from the first sampling converter 105 to interpolate between the frames of the screen according to an signal of a motion vector terminal 151. A motion area detector 109 detects an motion area of image signal output from the H-V LPF 103, according to the signal of the motion vector terminal 151. A mixer 107 mixes the signals output from the H-V LPF 103 and frame interpolator 106 according to the signal output from the motion area detector 109. A frequency shifter 108 recovers the frequency which was changed to high frequency band by the quadrature phase-shift demodulator 4 by shifting the output frequency output from the mixer 107.

Figure 3:
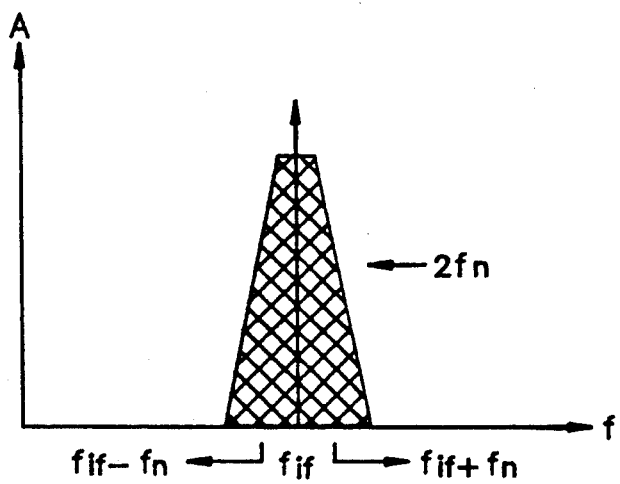
FIG. 3 is a graph showing the characteristic of a narrow frequency band intermediate frequency filter 2 shown in FIG. 1.

Referring to FIG. 3, it is a graphs showing the output characteristic of the narrow frequency-band intermediate frequency filter 2 in FIG. 1.

Figure 4A:
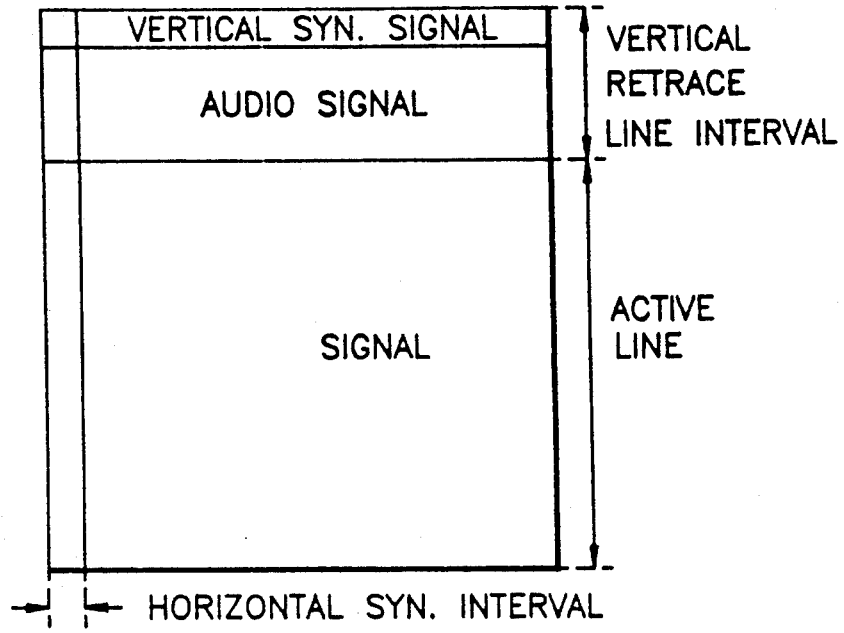
FIGS. 4A and 4B are data formats showing the signals output from first and second A/D converters 8, 9 in FIG. 1.
Figure 4B:
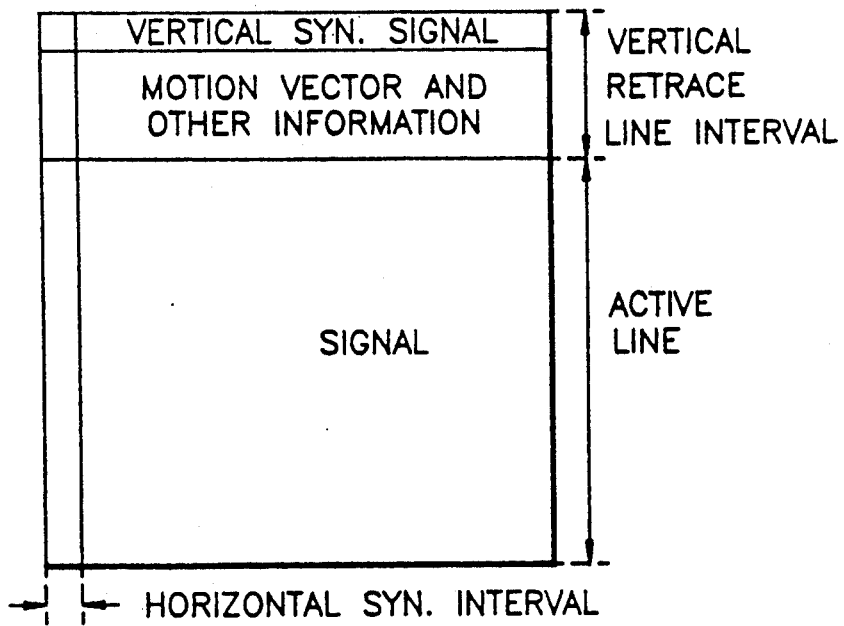

Referring to FIG. 4A, it is a format illustrating the output characteristic of the first A/D converter 8. FIG. 4B is a format illustrating the output characteristic of the second A/D converter 9. As shown in FIG. 4A, the vertical synchronizing and audio signals are processed during the vertical retrace line interval, and video signals during the active lines. Referring to FIG. 4B, otherwise, the vertical synchronizing signal and motion vector and other signal are processed during the vertical retrace line interval, and the video signal on the active lines.

Figure 5A:
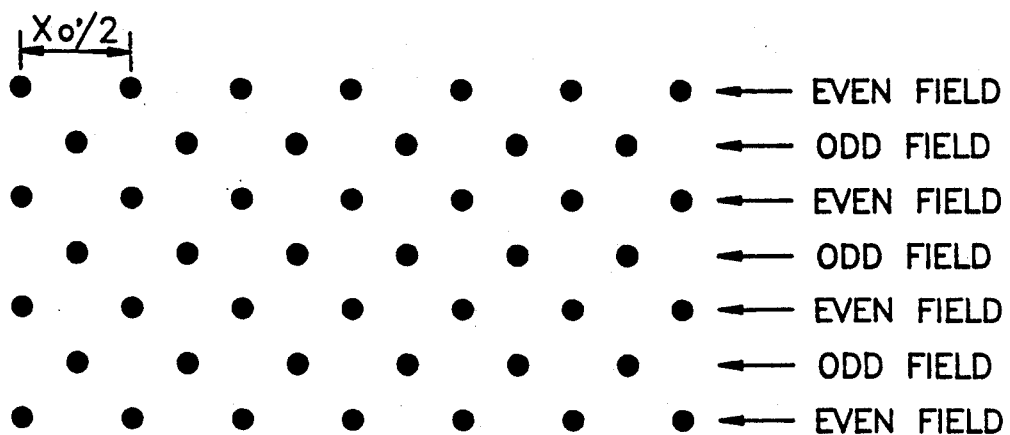
FIGS. 5A and 5B are schematic diagrams for showing the sampling structure transformation of a first and second field interpolators 104, 101 shown in FIG. 2.
Figure 5B:
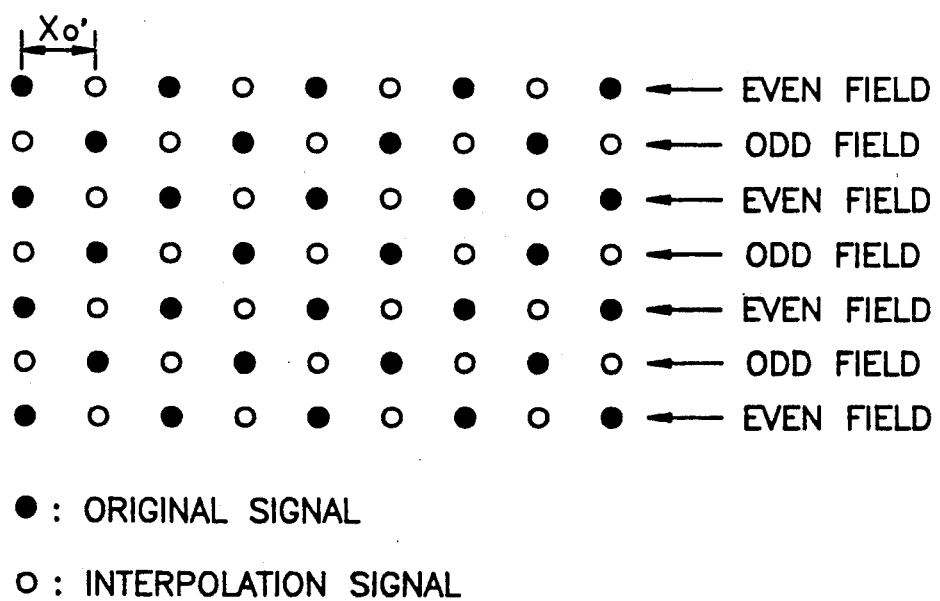

Referring to FIG. 5A, it is a schematic diagram illustrating the sampling structure before interpolation in the first and second interpolators 104 and 101. As shown in FIG. 5A, an even and an odd fields are crossed each other at line intervals of Xo'/2. FIG. 5B is a schematic diagram illustrating the sampling transformation after the interpolation in the first and second interpolators 104 and 101. In this case, white spots are represented as original signal and black spots as interpolation signal.

Figure 6:
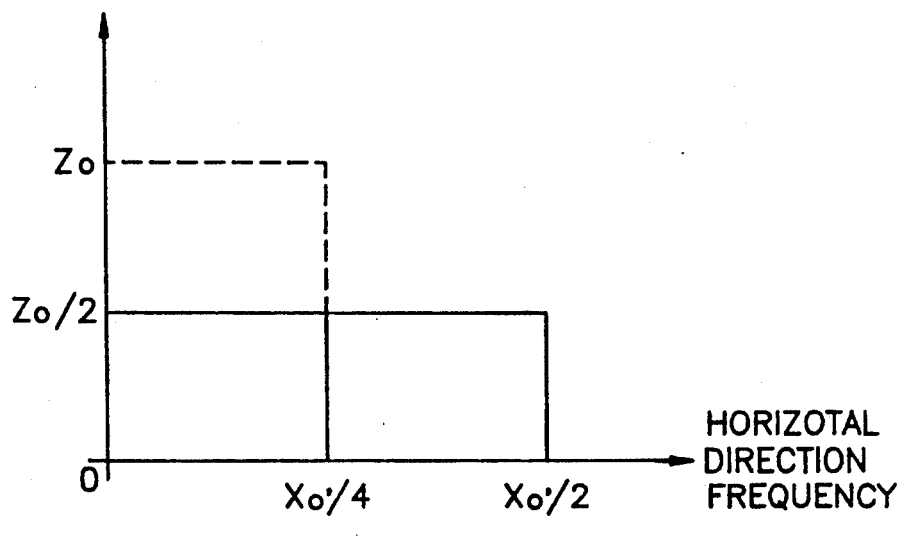
FIG. 6 is a graph for showing the spectrum transformation of the first field interpolator 104 shown in FIG. 2.

Referring to FIG. 6, it is a spectrum transformation schematic diagram when the signal output from the first A/D converter 8 is passing through the first field interpolator 104 in FIG. 2.

Figure 7A:
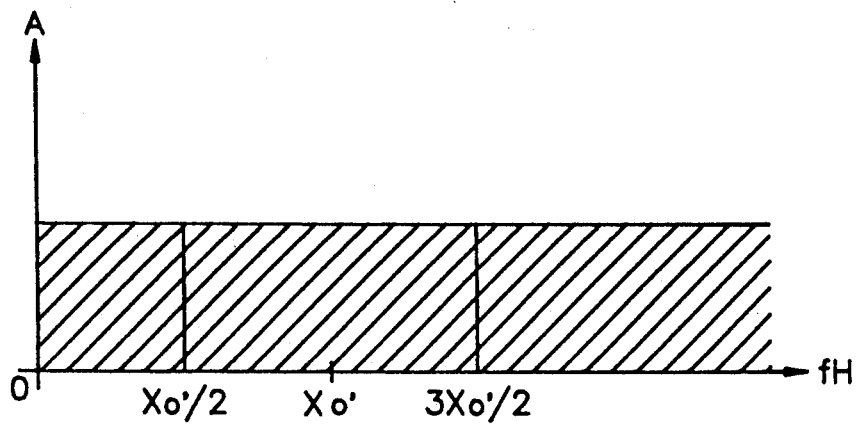
FIGS. 7A and 7B are graphs for showing the spectrum transformation of a first and second sampling converters 105, 102 of FIG. 2.
Figure 7B:
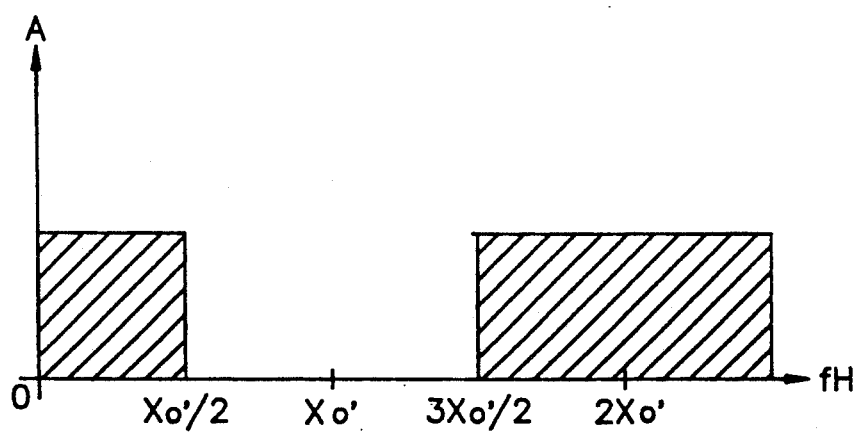

Referring to FIG. 7A, it is a graph illustrating the state before the spectrum transformation of the first sampling converters 105, 102. FIG. 7B is a graph illustrating the state after the spectrum transformation of the first and second sampling converters 105 and 102.

Figure 8A:
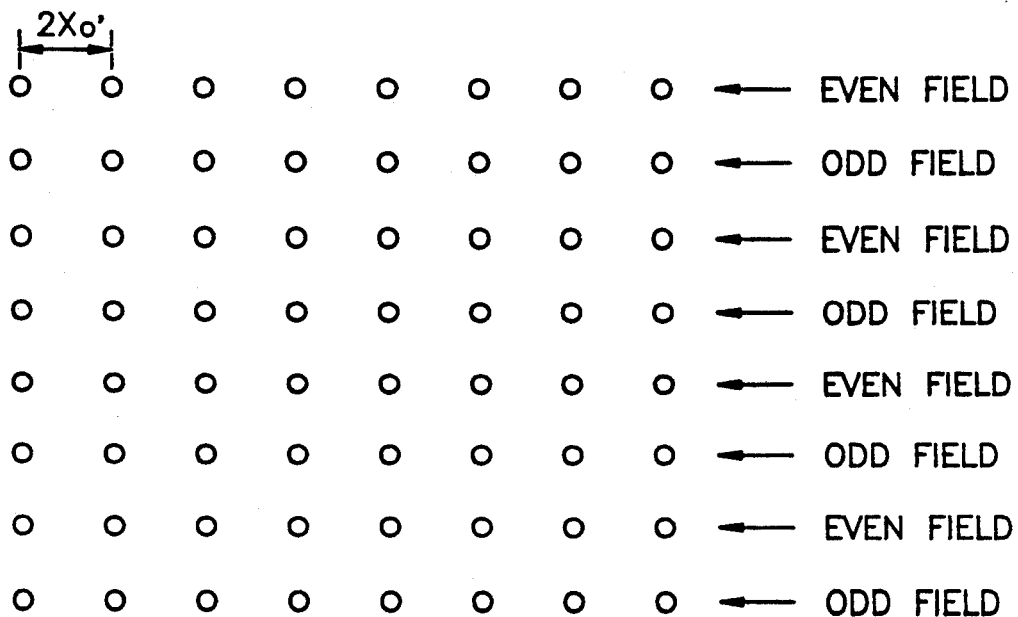
FIGS. 8A and 8B are schematic diagrams for showing the sampling transformation of a frame interpolator 106 of FIG. 2.
Figure 8B:
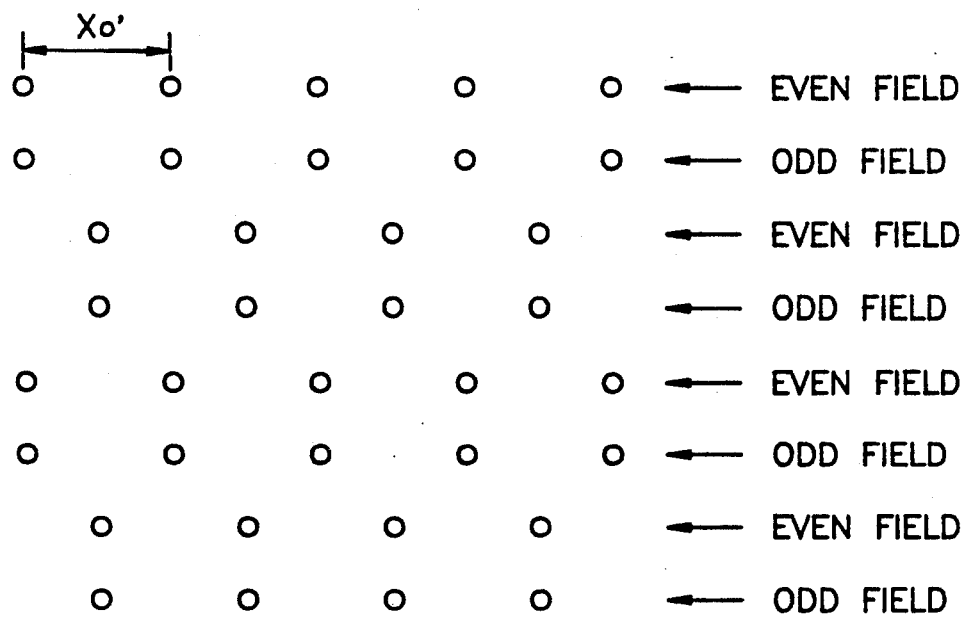

Referring to FIGS. 8A and 8B, they are schematic diagrams illustrating the states of before and after the sampling transformation of the frame interpolator 106 of FIG. 2, respectively.

Figure 9A:
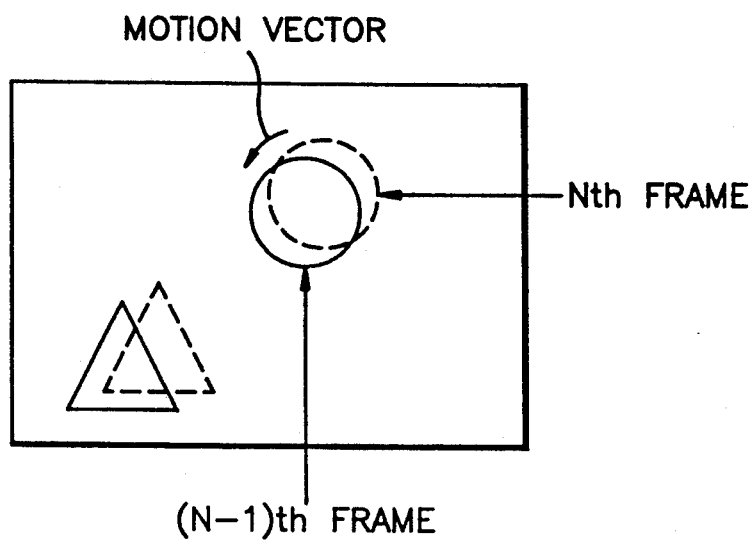
FIGS. 9A and 9B are processing diagrams showing frame interpolation carried out in the frame interpolator 106 of FIG. 2 according to a motion vector.
Figure 9B:
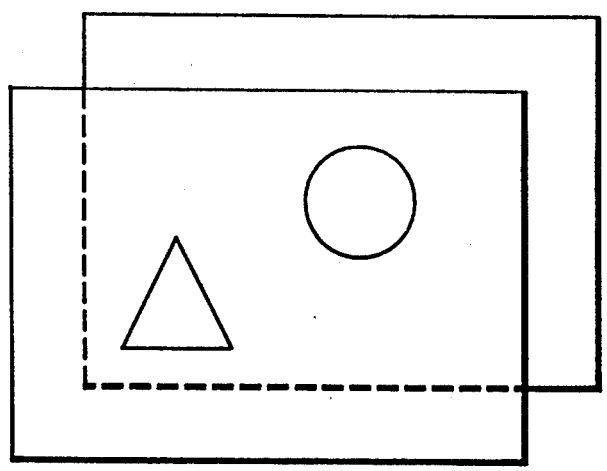

Referring to FIGS. 9A and 9B, they are processing diagrams illustrating frame interpolation operation according to motion vector, in the frame interpolator 106

Figure 10:
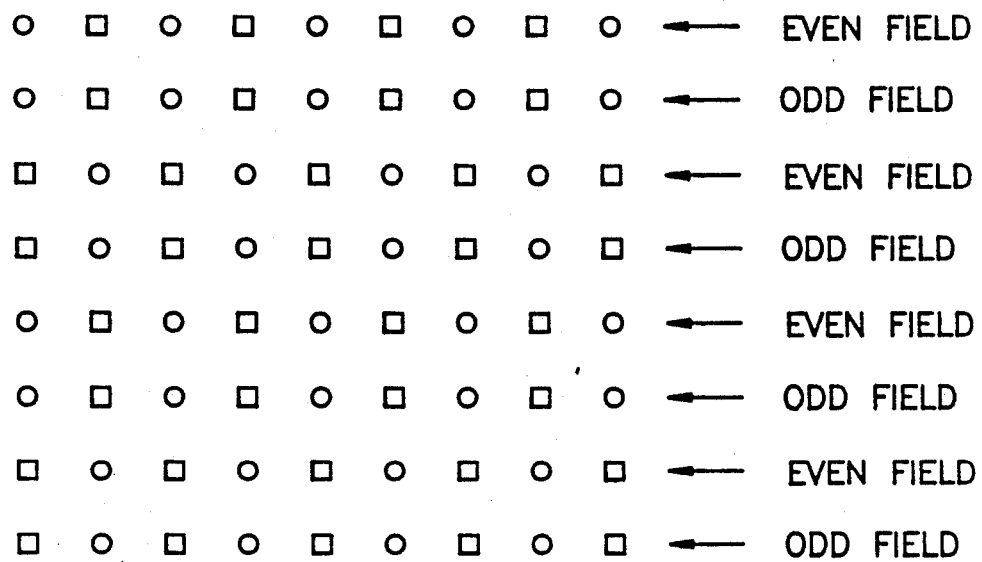
FIG. 10 is a schematic diagram for showing the interpolation between an Nth frame and (N−1)th frame.

Referring to FIG. 10, it is a schematic diagram illustrating the interpolation operation between the Nth and the (N−1)t h frames.

Figure 11:
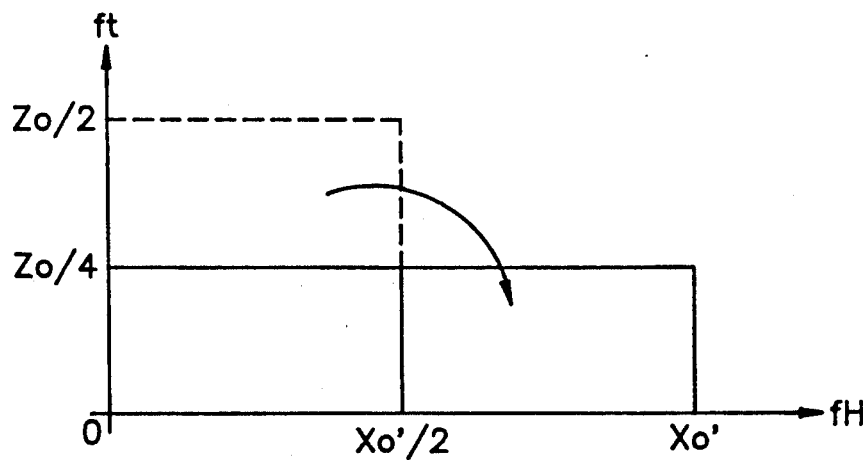
FIG. 11 is a graph for showing the spectrum transformation carried out during the frame interpolation.
Figure 12:
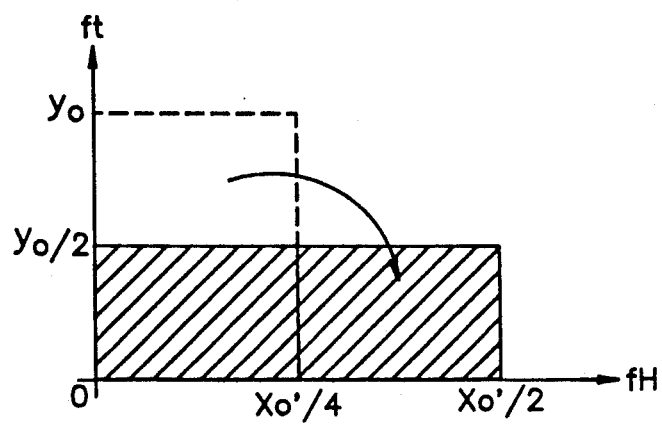
FIG. 12 is a graph for showing the spectrum transformation of the second field interpolator 101 of FIG. 2.

Referring to FIG. 11, it is a spectrum transformation diagram during the frame interpolation by the frame interpolator 106 of FIG. 2. Referring to FIG. 12, it is a spectrum transformation diagram of the second field interpolator 101 of FIG. 2.

Figure 13A:
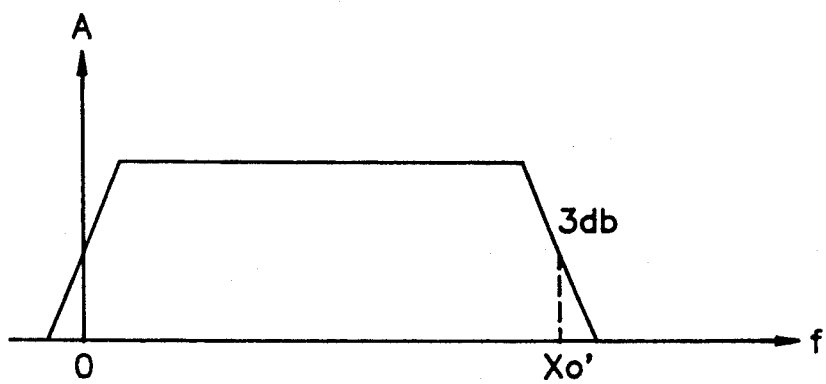
FIGS. 13A and 13B are graphs for showing the input/output characteristics of the frequency shifter 108 shown in FIG. 2.
Figure 13B:
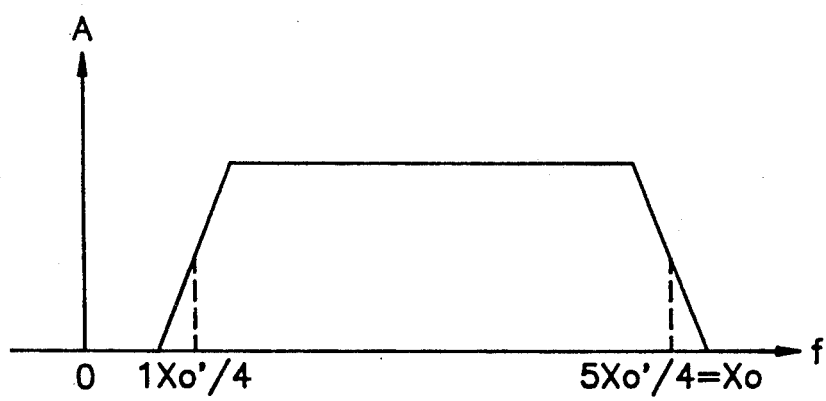

Referring to FIGS. 13A, 13B are graphs illustrating the states of before and after the frequency shifting by the frequency shifter 108 of FIG. 2, respectively.

Figure 14A:
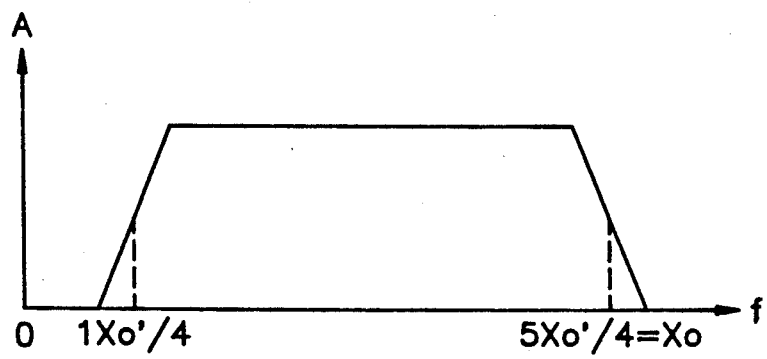
FIGS. 14A through 14C are graphs for showing the input/output spectrum of an adder 12 of FIG. 1.

Referring to FIG. 14A, it is an output spectrum by the frequency shifter 108 of FIG. 2. FIG. 4B is an output spectrum by the delaying circuit 11 in FIG. 1. FIG. 4C is an output spectrum by the adder 12 of FIG. 1.

Referring to FIG. 15, it is an input signal format of the inversion ITLC circuit 13 of FIG. 1.

Referring to FIGS. 16A and 16B, they are graphs illustrating spectrum in vertical-horizontal and time-horizontal axes respectively of the inversion ITLC circuit 13 or of the first and the second A/D converters 8, 9 in FIG. 1.

Now, referring to FIG. 1 to FIG. 16, an embodiment of the present invention will be described in detailed.

The RF signal applied to the receiving processor 1 through the antenna ANT is detected as an intermediate frequency (IF) and then applied to the narrow frequency band IF filter 2 and the IF filter 3. The output characteristic graph of the narrow frequency band IF filter 2 is as shown in FIG. 3. The upper and lower sidebands centering on the intermediate frequency are respectively distributed with bandwidth fn. It is desirable that the bandwidth fn should be as narrow as it can be. Accordingly, the narrow frequency-band intermediate frequency filter 2 filters only an intermediate frequency $f_{if}$ containing the carrier signal. The signal output from the filter 2 is applied to the FPLL 5 to lock the narrow frequency intermediate frequency signal in a fixed state. In this case, the frequency of signals output from the FPLL 5 is always the $f_{if}$ but phases thereof are difference. The intermediate frequency signal frequency locked by the FPLL 5, is applied to the 90° phase-shifter 43 and the multiplier 42 in the quadrature phase-shift demodulator 4. The multiplier 41 received the signal output from the 90° phase-shifter 43 and multiplier 42, demodulate the signals output from the IF filter 3. The IF filter 3 filters only the intermediate frequency signal to be required in the HDTV out of the signals output from the receiving processor 1.

The signal applied to the quadrature phase-shift demodulator 4 is processed according to the signal output from the FPLL 5. The signal output from the IF filter 3 is multiplied by the signal output from the FPLL 5 through the multiplier 42 to pass only in-phase base band video signal in accordance with the phase. The signal output from the intermediate filter 3 is multiplied by the signal 90° phase-shifted through the 90° phase-shifter 43 by the multiplier 41, so as to be passed only quadrature-phase base band video signal. In this case, the signal output from the multiplier 42 is low frequency band signal which is passed only frequency band of ($\frac{1}{4}$)Xo' by the second LPF 7.

The signal output from the second LPF 7 is converted to a digital signal by the second A/D converter 9 and supplied to the delaying circuit 11. The delaying circuit 11 delays the signal output from the second A/D converter 9 as much as the time consumed for processing the signal output from the first A/D converter 8 by the high frequency band signal processor 10. The signals output from the second A/D converter 9 and the first A/D converter 8 are supplied to the separator 15.

The output signal multiplied by the multiplier 41 is at high band frequency and the frequency band of ($\frac{1}{4}$)Xo' thereof is filtered by the first LPF 6. The signal output from the first LPF 6 is converted to digital signal by the first A/D converter 8. The signal output from the first A/D converter 8 is commonly supplied to both the high frequency band signal processor 10 and the separator 15. The separator 15 receives the signal output from the first A/D converter 8 in order to separate into the synchronous and audio signals, and also receives the signal output from the second A/D converter 9 in order to separate into the motion vector and other information (TTX etc.). The audio signal output from the the separator 15 is processed during the vertical retrace interval as shown in FIG. 4A, and the motion vector and other information output therefrom are processed during the vertical retrace interval as shown in FIG. 4B. A horizontal synchronizing signal is processed in the first portion of the horizontal line and a vertical synchronizing signal is processed in the first portion of the field, as shown in FIGS. 4A and 4B.

Referring to FIG. 2, the signal output from the first A/D converter 8 is supplied to the first field interpolator 104 or to the the second field interpolator 101. The sampling structure of the input signal of the first field interpolator 104 is represented as FIG. 5A, and the sampling structure of the signal output from the first field interpolator 104 is in FIG. 5B. The signal of the sampling frequency ($\frac{1}{2}$)Xo' as shown in FIG. 5A is converted to the signal of sampling frequency Xo' after interpolating as shown in FIG. 5B. The black and white spots of FIG. 5B indicate respectively the original signal and the signal interpolated by the first field interpolator 104.

On the other hand, the spectrum of the signal interpolated by the first field interpolator 104 is represented as shown in FIG. 6, and the interpolated signal is at the frequency band of 0 to ($\frac{1}{2}$)Zo in the temporal axis and 0 to ($\frac{1}{2}$)Xo' and the horizontal axis, respectively. In this case, the Zo indicates a frame frequency. Before interpolating by the first field interpolator 104, the spectrum of the signal output from the first A/D converter 8 is distributed in the region 0 to Zo in the temporal axis and 0 to ($\frac{1}{4}$)Xo' in the horizontal axis, respectively. As a result of the interpolation in the first field interpolator 104, the spectrum distributed in the region by 0 to Zo in the temporal axis and 0 to ($\frac{1}{4}$)Xo' in the horizontal axis, changes to a new spectrum distributed in the region by 0 to ($\frac{1}{2}$)Zo in the temporal axis and 0 to ($\frac{1}{2}$)Xo' the horizontal axis, respectively. Consequently, the band of 0 to (1/4)Xo, in the horizontal axis is folded so that the signal of frequency band of 0 to ($\frac{1}{2}$)Xo' is generated in the horizontal axis.

When the field is interpolated by the first field interpolator 104, the first field interpolator 104 receives motion vector information from the motion vector terminal 151. The previous field out of two fields is moved according to the motion vector. The sampling frequency Xo' of the signal output from the first field interpolator 104 is two times larger than the sampling frequency 2Xo' of the signal from the first sampling converter 105. A spectrum structure according to the signal output from the first sampling converter 105 is shown in FIGS. 7A and 7B. The vertical axis represents the amplitude of the signal, and the horizontal axis the frequency, as shown in FIGS. 7A and 7B. FIG. 7A shows the state of spectrum before sampling transformation, and FIG. 7B shows the state of spectrum after that, an input to output signal ratio of the first sampling converter 105 being 1:2.

The signal output from the first sampling converter 105 is applied to the frame interpolator 106. The signal output from the frame interpolator 106 is processed according to the motion vector information output from the motion vector terminal 151 so as to interpolate inter-frame of video signal. The the sampling structure as shown in FIG. 8A is converted into the the sampling structure as shown in FIG. 8B by frame interpolation operation. The previous frame and present frame are interpolated by the frame interpolator 106, as shown in FIG. 8B. If, before interpolated the two frame signals by the frame interpolator 106, panning or scrawling occurs on the transmission screen, the previous frame is shifted according to the motion vector output from the motion vector terminal 151. When the (N−1)th frame signed as dotted line moves to the Nth frame signed as solid line, as shown in FIG. 9A, the frame is shifted as much as the quantity of the motion vector, as shown in FIG. 9B. Then, the signal shifted according to the motion vector is interpolated by the frame interpolator 106 such that Nth and (N−1)th frame signals are interpolated so as to produce one frame, and as shown in FIG. 10. The signal output from the frame interpolator 106 is applied to the mixer 107.

Referring to FIG. the operation of the frame interpolation by the frame interpolator 106 will be described in further detail. The spectrum distributed in the band by 0 to $(\frac{1}{2})Zo$ and in the temporal axis and 0 to $(\frac{1}{2})Xo'$ in the horizontal axis, changes to a new spectrum distributed in the band by 0 to $(\frac{1}{4})Zo$ in the temporal axis and 0 to $Xo'$ in the horizontal axis. That is, the frequency band of 0 to $(\frac{1}{2})Xo'$ in the horizontal axis is folded so that high frequency band signal is generated in the horizontal axis. As a result of frame interpolation operation, the spectrum distributed in the band by 0 to $(\frac{1}{4})Zo)$ and $(\frac{1}{2})Xo'-Xo'$ is recovered.

On the other hand, the signal output from the first A/D converter 8 is also applied to the second field interpolator 101. The operation of the second field interpolator 101 is similar to that of the first field interpolator 104, interpolating the spectrum structure of FIG. 5A into that of FIG. 5B. But the folding frequency of the second field interpolator 101 is not the same as that of the first field interpolator 104. The the spectrum distributed in the band 0 to Yo in the vertical axis C and 0 to $(\frac{1}{2})Xo'$ in the horizontal axis, changes to a new spectrum distributed in the band by 0 to $(\frac{1}{2})Yo$ in the vertical axis and 0 to $(\frac{1}{2})Xo'$ in the horizontal axis, as shown in FIG. 12. In this case, the Yo indicates the number of total lines. The above signal of the band $(\frac{1}{4})Xo'$ to $(\frac{1}{2})Xo'$ in the temporal axis is folded at 0 to $(\frac{1}{4})Xo'$ in the temporal axis and $(\frac{1}{2})Yo$ to Yo in the vertical axis, when the transmitting part processes the transmission signal.

The signal output from the second field interpolator 1?1 is sampled by the second sampling converter 102 of FIG. 2, the input to output signal ratio of the second sampling converter 102 being 1:2. The operation of the first sampling converter 105 is similar to that of the second sampling converter 102, converting the spectrum structure of FIG. 7A into that of FIG. 7B. The converted signal output from the second sampling converter 102 is applied to the H-V LPF 103 which filters the frequency of the hatched portion as shown in FIG. 12. The LPF 103 passes the band of 0 to $(\frac{1}{2})Yo$ in the vertical axis and 0 to $(\frac{1}{2})Xo'$ in the horizontal axis. The signal output from the H-V LPF 103 is applied to the mixer 107.

The motion area detector 109 detects the motion area of the signal output from the H-V LPF 103 in accordance with the state of the motion vector terminal 151.

The motion area detector 109 detects the motion area of the image according to the signal of the motion vector terminal 151 and controls the mixer 107 according to the motion value of the motion area. The signals output from the H-V LPF 103 and frame interpolator 106 are mixed in the mixer 107 according to the signal output from the motion area detector 109. The motion are detector 109 received the signal output from the H-V LPF 109 compares the Nth present frame signal with the (N−1)th previous frame signal. However, if the compared signal is detected as a signal on the state of the panning or scrawling, the motion area detector 109 cannot detect the motion area. However, because the motion area detector 109 detects the whole frame as the motion area itself, the motion area detector 109 detects the motion area by comparing the previous frame with the present frame, after shifting the previous frame signal so the quantity of the vector moved according to the motion vector, as shown in FIG. 9A. The momentum K of the detected motion area is applied to the mixer 107 which mixes the signals output the H-V LPF 103 and frame interpolator 106 according to the signal output from the motion area detector 109, so as to satisfy an equation $$St = K \cdot Sm + (1-k) \cdot Ss$$

where the Sm indicates the signal output from the H-V LPF 103, the Ss indicates the signal output from the frame interpolator 106, the St indicates the signal output from the mixer 17 and K indicates momentum.

Figure 14B:
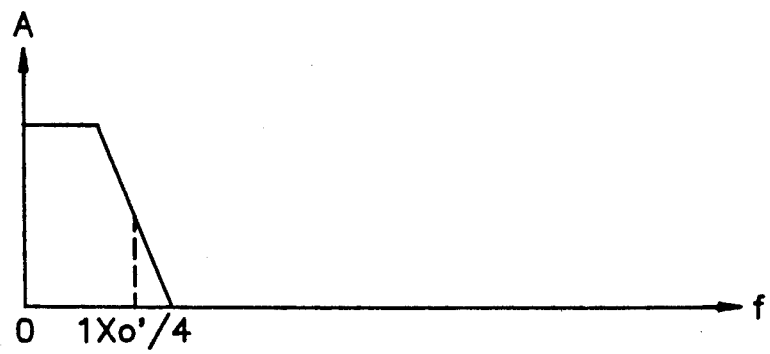
Figure 14C:
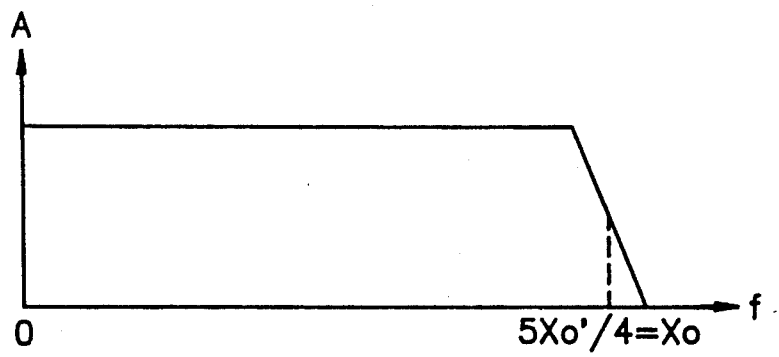

The signal output from the mixer 107 is applied to the frequency shifter 108. The signal frequency band of 0 to Xo' as shown in FIG. 13A is shifted by $(\frac{1}{4})Xo'$ to the frequency band of $(\frac{1}{4})Xo'$ to $(5/4)Xo'$ as shown in FIG. 13B. The signal output from the mixer 107 is shifted by the frequency shifter 108 in order to recover the frequency which is changed to high band by the quadrature phase-shift demodulator 4. The signal output from the frequency shifter 108 is applied to the adder 12 of FIG. 1. The adder 12 adds the low frequency band signal output from the delaying circuit 11 to the signal output from the high band signal processor 10. FIG. 14A and 14B show respectively the spectrum of signal output from the high band signal processor 10 and the spectrum of the signal output from the delaying circuit 11, and FIG. 14C shows the spectrum of the signal output from the adder 12. The frequency band of the spectrum in FIG. 14C is Xo in the horizontal axis. In this case, $Xo = (5/4)Xo'$.

The signal signal output from the adder 12 is applied to the inversion ITLC circuit 13. The chrominance signal C out of signal applied to the inversion ITLC circuit 13, is time compressed in the region of $\frac{1}{4}$ of the lines. The luminance signal Y out of signal applied to the inversion ITLC circuit 13, is time compressed in the other region of $\frac{3}{4}$ of the lines, as shown in the FIG. 15. The chrominance signal is constituted in the order of R-Y and B-Y every lines in the field, and in the order of R-Y, R-Y, B-Y and B-Y every lines in the frame. The inversion ITLC circuit 13 generates luminance signal Y, chrominance signals R-Y, B-Y, and time-expands the luminance signal Y by 4/3 times and the chrominance signal C by 3 times in the direction of temporal, respectively.

Referring to FIGS. 16A and 16B, the spectrum of the signal output from the inversion ITLC circuit 13 are represented as the graphs in the vertical and horizontal axes, and in the time and horizontal axes, respectively. A dotted and solid line in FIGS. 16A and 16B represents the spectrum of motion signal and still signal, respectively. The signal output from the inversion ITLC circuit 13 is applied to the D/A converter 14 in order to convert the chrominance and luminance signals into the analog signals. Then, the signal output from the D/A converter 14 is processed to be applied to a monitor by a circuit for controlling the monitor (not shown).

As described in the foregoing, the present invention has an advantage that the HDTV signals adopt the same frequency band as that of the existing color TV when the HDTV signals are aired, while keeping the compatibility with the existing color TV. In this case, the channel unused in the existing color TV is used to transmit the HDTV signal.

While the invention has been particularly shown and described with reference to a preferred embodiment, it will be understood by those skilled in the art that modifications in detail may be made without departing from the spirit and scope of the invention.

What is claimed is:

1. A circuit for processing a high definition television signal, said circuit comprising:

receiving processor means for converting a radio frequency signal supplied through a receiving terminal into a first intermediate frequency signal;

first filter means connected to said receiving processor means, for generating a narrow band intermediate frequency signal from the first intermediate frequency signal;

second filter means connected to said receiving processor means, for splitting a second intermediate frequency signal from the first intermediate frequency signal;

frequency phase locked loop means connected to said first filter means, for demodulating the second intermediate frequency signal in a quadrature phase-shift demodulation technique with a quadrature phase shift demodulator with the narrow band intermediate frequency signal to generate a slow band frequency signal and a high band frequency signal;

first low-pass filter means and second low-pass filter means connected to the frequency phase locked loop means, for low-pass filtering with a pass band of $(\frac{1}{4})Xo'$ said low band frequency signal and the high band frequency signal, said first low-pass filter means receiving said high band frequency signal, said second low-pass filter means receiving said low band frequency signal;

a first analog-to-digital converter and a second analog-to-digital converter connected to said first low-pass filter means and said second low-pass filter means, respectively, for converting the low band frequency signal and the high band frequency signal from said first low-pass filter means and said second low-pass filter means, respectively, into a first digital signal and a second digital signal;

separator means connected to said first analog-to-digital converter and said second analog-to-digital converter, for separating the low band frequency signal and the high band frequency signal from said first analog-to-digital converter and said second analog-to-digital converter into a synchronizing signal, an audio signal, a motion vector and a control signal;

audio decoder means connected to said separator means, for decoding said audio signal;

high frequency band signal processor means connected to said first analog-to-digital converter, for interpolating said first digital signal in response to said motion vector;

delay means connected to said second analog-to-digital converter, for delaying said second digital signal;

adding means connected to said high frequency band signal processor means and said delay means for adding the signal output from said high frequency band processor means to the signal output from said delay means;

an inversion integration of time compressed luminance and chrominance means connected to said adding means, for converting a signal output from said adding means into a luminance signal and chrominance signal; and a digital-to-analog converter connected to said inversion integration of time compressed luminance and chrominance means, for converting said luminance signal and said chrominance signal into respective analog signals.

2. A circuit as claimed in claim 1, wherein said high frequency band signal processor means comprises:

second field interpolator means connected to said first analog-to-digital converter, for interpolating inter-field of the signal output from said first analog-to-digital converter according to said motion vector;

first field interpolator means connected to said first analog-to-digital converter, for interpolating inter-field of the signal output from said first analog-to-digital converter according to said motion vector;

second sampling converter means connected to said second field interpolator means, for sampling the signal output from the second field interpolator means, an input to output signal sampling ratio being 1:2;

first sampling converter means connected to said first field interpolator means, for sampling the signal output from the first field interpolator means, an input to output signal sampling ratio being 1:2;

horizontal-vertical low-pass filter means connected to said second sampling converter, for low-pass filter the signal output from said second sampling converter means, in horizontal and vertical axes;

frame interpolator means connected to said first sampling converter, for interpolating inter-field of the signal output from the first sampling converter means according to the motion vector from said separating means;

motion area detector means receiving the motion vector from said separating means, for detecting a motion region of the signal output from said horizontal-vertical low-pass filter means according to the motion vector from said separating means;

mixer means connected to said motion area detector means and said frame interpolator means, for mixing the signal output from said horizontal-vertical low-pass filter means with the signal output from said frame interpolator means according to the signal output from said motion detector means, and frequency shifter means connected to said mixer means, for shifting frequency of the signal output from said mixer means to a higher frequency.

3. A method for receiving a high definition television signal, comprising the steps of:
- processing the received high definition television signal into a narrow band intermediate frequency signal and an intermediate band frequency signal;
- locking said narrow band intermediate frequency signal into a predetermined fixed frequency and demodulating the intermediate band frequency signal in a quadrature phase-shift demodulation technique in response to the narrow band intermediate frequency signal to produce a high band frequency signal and a low band frequency signal;
- low-pass filtering the demodulated high band frequency signal and the demodulated low band frequency signal;
- converting the low-pass filtered high band frequency signal and low band frequency signal into a first digital signal and second digital signal, respectively;
- separating the first digital signal and second digital signal into a synchronizing signal, an audio signal and a control signal;
- processing the first digital signal in response to the control signal to create a processed first digital signal; and
- adding the second digital signal to the processed first digital signal to create an added signal; and
- separating the added signal into luminance signal and chrominance signal.

4. A method as claimed in claim 3, wherein said step for processing the first digital signal, comprises the steps of:
- (a) interpolating inter-field of the first digital signal according to a motion vector signal to produce a first interpolated signal and a second interpolated signal;
- (b) sampling said first interpolated signal and said second interpolated signal for respectively producing a first sampling signal and a second sampling signal, wherein a sampling frequency in the first interpolated signal to the first sampling signal is 1 to 2 and a sampling frequency of the second interpolated signal to the second sampling signal is 1 to 2;
- (c) interpolating inter-frame the first sampling signal in response to said motion vector, low-pass filtering the second sampling signal in a horizontal axis and a vertical axis, mixing the first sampling signal and the second sampling signal according to a motion area detection value and producing a mixed signal; and
- (d) shifting a frequency of said mixed signal.

5. A method as claimed in claim 4, wherein said motion area detection value of said (c) is calculated from said motion vector according to the signal output from a horizontal-vertical low-pass filter.

6. A circuit for receiving a high definition television signal, said circuit comprising:
- first means for converting a radio frequency signal to a first intermediate frequency signal and splitting therefrom a narrow frequency band signal containing a carrier signal and a second intermediate frequency signal;
- second means connected to said first means, for locking the narrow band intermediate frequency signal into a fixed frequency signal and for demodulating the second intermediate band frequency signal in a quadrature phase-shift demodulation technique so as to generate a high band frequency signal and a low band frequency signal;
- third means connected to said second means, for low-pass filtering the high frequency band signal and the low frequency band signal and then converting the high frequency band signal and the low frequency band signal into a first digital signal and a second digital signal, respectively;
- fourth means connected to said third means, for separating a synchronizing signal, an audio signal, a motion vector and a control signal from said first digital signal and said second digital signal;
- fifth means connected to said third means, for interpolating inter-field and interpolating inter-frame of said first digital signal according to said motion vector and generating an interpolated signal; and
- sixth means connected to said fifth means, for adding the interpolated signal to the second digital signal and then for separating a luminance signal and a chrominance signal therefrom to convert into respective analog signals.

7. A circuit as claimed in claim 6, wherein said second means comprises:
- a first multiplier for multiplying the fixed frequency signal by the second intermediate frequency signal; and
- a second multiplier for multiplying a the fixed frequency signal phase-shifted by 90° by the second intermediate frequency signal.

8. A circuit as claimed in claim 7, wherein the signals output from said first multiplier and said second multiplier are relatively positioned at the high and low band frequency, respectively.

9. A circuit for processing a high definition television signal, said circuit comprising:
- high frequency band signal processor means for generating a processed signal by interpolating a digital high frequency signal in response to a motion vector signal;
- adder means for generating an added signal by adding a low frequency signal to the processed signal;
- receiving processor means for generating a first intermediate frequency signal by converting a radio frequency signal to a lower frequency;
- first filter means for generating a narrow frequency signal by narrow band filtering the intermediate frequency signal;
- frequency phase locked loop means for generating a constant frequency signal by generating a signal with a constant frequency from the narrow frequency signal;
- second filter means for generating a filtered intermediate signal by filtering out extraneous signals from the intermediate frequency signal;
- quadrature phase shift demodulator means for generating a low band frequency signal and a high band frequency signal by demodulating the filtered intermediate frequency signal using quadrature phase shift demodulation;
- second low pass filtering means for generating a filtered low frequency signal by low pass filtering the low frequency signal;
- first low pass filtering means for generating a filtered high frequency signal by low pass filtering the high frequency signal;
- a second analog-to-digital converter for generating the digital low frequency signal by converting the filtered low frequency signal into a digital signal; and a first analog to digital converter for generating the digital high frequency signal by converting the filtered high frequency signal into a digital signal.

10. The circuit for processing a high definition television signal according to claim 9, wherein first filter means has a center frequency of a carrier of the intermediate frequency signal.

11. The circuit for processing a high definition television signal according to claim 9, wherein the filtered intermediate signal is demodulated by multiplying the first intermediate signal by the constant frequency signal and a 90° phase shifted constant frequency signal.

12. The circuit for processing a high definition television signal according to claim 9, wherein bandwidth of the filtered low frequency signal is 0.25 Xo'.

13. The circuit for processing a high frequency television signal, according to claim 9, wherein the filtered high frequency signal has a bandwidth of Xo'.

14. The circuit for processing a high frequency television signal, according to claim 9, further comprising:
separating means for separating out a synchronizing signal, an audio signal, the motion vector signal, and a control signal from the digital high frequency signal and the digital low frequency signal.

15. The circuit for processing a high frequency television signal, according to claim 14, wherein the audio signal is found in a vertical retrace interval.

16. The circuit for processing high definition television signal, according to claim 14, wherein the motion vector signal is found in a vertical retrace line interval.

17. The circuit for processing a high definition television signal, according to claim 14, wherein the horizontal synchronizing signal is found in a portion of the vertical retrace line interval.

18. A circuit for processing a high definition television signal, according to claim 14, wherein the vertical synchronizing signal is found in a first portion of the field.

19. A circuit for processing a high definition television signal, according to claim 14, further comprising audio decoder means generating an audio output signal for decoding the audio signal.

20. The circuit for processing a high definition signal, according to claim 9, the high frequency band signal processor comprising:
first field interpolating means for generating a first interpolated signal by interfield interpolation and thereby doubling the sampling frequency of the digital high frequency signal;
first sampling converter means for generating a first converted signal by doubling the sampling frequency of the first interpolated signal;
frame interpolating means for generating a frame interpolated signal by interpolating a preset frame, with the present frame and a previous frame shifted in response to the motion vector signal;
second field interpolator means for generating a second interpolated signal by interfield interpolating the digital high frequency signal;
second sampling converter means for generating a second converted signal by doubling the sampling frequency of the second interpolated signal;
horizontal-vertical filter means for generating a low pass filtered signal by low pass filtering the second converted signal in the horizontal and vertical directions;
motion area detector means for generating a motion area signal in response to the low pass filtered signal and the motion vector signal; and
mixer means for generating a processed signal by mixing the low pass filtered signal, the frame interpolated signal and the motion area signal.

21. The circuit for processing a high definition television signal, according to claim 20, wherein the digital high frequency signal has a spectrum distributed in the region zero to Zo on the temporal axis and zero to 0.25 Xo' in the horizontal axis, wherein the Zo is the frame frequency.

22. The circuit for processing a high definition television signal, according to claim 20, wherein a spectrum of the first interpolated signal is distributed in a region 0 to 0.5 Zo on the temporal axis and 0 to 0.5 Xo' on the horizontal axis.

23. The circuit for processing a high definition television signal, according to claim 20, wherein the first field interpolator moves a field of the digital high frequency signal in response to the motion vector signal.

24. The circuit for processing a high definition television signal, according to claim 20, wherein the frame interpolating means shifts the previous frame in response to the motion vector, the motion vector representing the degree of panning between the previous frame and the present frame.

25. The circuit for processing a high definition television signal, according to claim 20, wherein:
first converted signal has a spectrum distributed in a region 0 to 0.5 Zo in the temporal axis and 0 to 0.5 Xo' on the horizontal axis, wherein Zo is the frame frequency.
the frame interpolated signal is a region distributed in zero to 0.25 Zo in a temporal axis and zero to Xo' on the horizontal axis.

26. The circuit for processing a high definition television signal, according to claim 20, wherein the signal shifted in response to the motion vector is interpolated by the frame interpolator such that the previous frame and the present frame are interpolated to produce one frame.

27. The circuit for processing a high definition television signal, according to claim 20, wherein the digital high frequency signal has a spectrum distributed in zero to Yo in the vertical axes and zero to 0.25 Xo' in the horizontal axis, Yo being the number of total lines, is transformed to a spectrum distributed in zero to 0.25 Yo in the vertical axis and 1.5 Xo' in the horizontal axis.

28. The circuit for processing a high definition television signal, according to claim 20, wherein the motion area detector means compares a present frame signal with a previous frame signal, the previous frame being shifted in response to the motion vector signal so that a motion area may be detected.

29. The circuit for processing a high definition television signal, according to claim 20, wherein the mixer means mixes the low pass filtered signal, the frame interpolated signal, and the motion area signal according to the equation:

$$St = K \cdot Sn + (1-K) \cdot Ss,$$

wherein Ss is the low pass filtered signal, Sn is the frame interpolated signal, K is the motion area signal, and St is the mixer signal.

30. The circuit for processing a high definition television signal, according to claim 20, wherein the high frequency signal processor means further comprises frequency shifter means for shifting the processed signal to a higher frequency.

31. The circuit for processing the high definition television signal, according to claim 30, wherein the frequency shifter means shifts the processed signal so that the processed signal has a bandwidth substantially from 0.25 Xo' to 1.25 Xo'.

32. The circuit for processing a high definition television signal, according to claim 9, further comprising delaying means for delaying the digital low frequency signal by a time increment equivalent to the time increment in which the high frequency band signal processor processes the digital high frequency band signal into the processed signal.

33. The circuit for processing a high definition television signal, according to claim 9, further comprising reversion integration of time compressed luminance and chrominance circuit means for generating a luminance signal and a chrominance signal B/Y, R/Y from the added signal.

34. The circuit for processing a high definition television signal, according to to claim 33, wherein the reversion integration of time compressed luminance and chrominance circuit means time expands the luminance signal by 1.25 times and the chrominance signal by 3 times.

35. The circuit for processing a high definition television signal, according to claim 9, wherein:
   the added signal comprises a compressed chrominance signal portion and a compressed luminance signal portion wherein the chrominance signal portion is constituted in order of R/Y and B/Y every line in the field, and in the order of R/Y, R/Y, B/Y, and B/Y, very line in the frame.

36. The circuit for processing a high definition television signal, according to claim 20, wherein the horizontal vertical filter means passes a band of 0 to 0.5 Yo in the vertical axis and 0 to 0.5 Xo' in the horizontal axis, Yo being a total number of lines.

* * * * *

UNITED STATES PATENT AND TRADEMARK OFFICE
CERTIFICATE OF CORRECTION

PATENT NO. : 5,200,811
DATED : 6 April 1993
INVENTOR(S) : Hyun Deok CHO

It is certified that error appears in the above-identified patent and that said Letters Patent is hereby corrected as shown below:

Claim 1, Column 9, Line 42, change "slow" to --low--;

Claim 2, Column 10, Line 48, change "filter" to --filtering--;

Claim 35, Column 16, Line 16, change "very" to --every--.

Signed and Sealed this

Fifteenth Day of March, 1994

BRUCE LEHMAN

*Attest:*

*Attesting Officer*  *Commissioner of Patents and Trademarks*